June 9, 1931.  A. J. BAKER ET AL  1,809,100
ELECTRIC SWITCH FOR AUTOMOBILES
Filed March 14, 1924  2 Sheets-Sheet 1
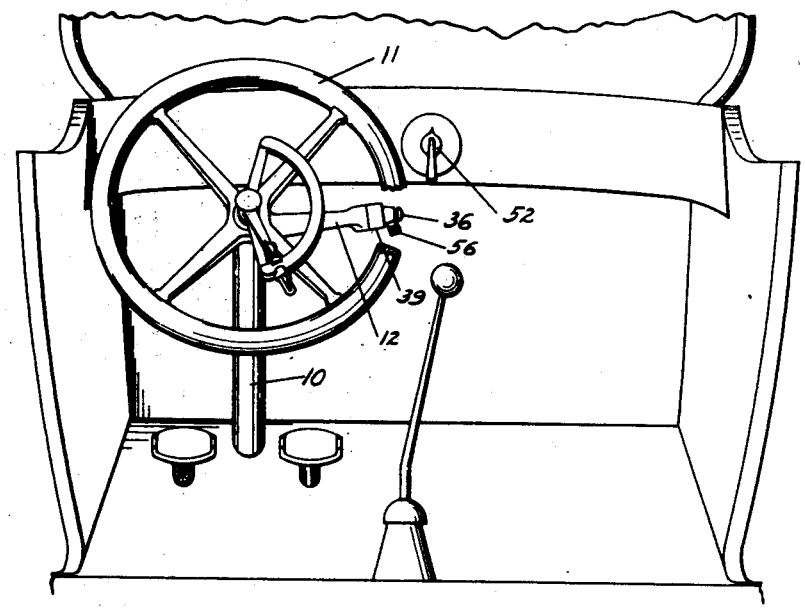
Fig. I
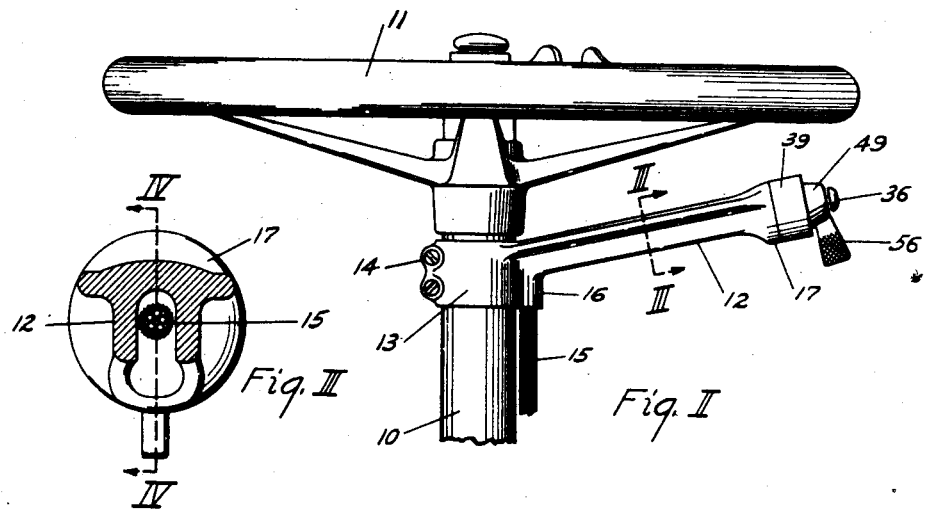
Fig. II  Fig. III
Inventors.
Arthur J. Baker
Edward E. Huntington
BY Solon J. Boughton
ATTORNEY.

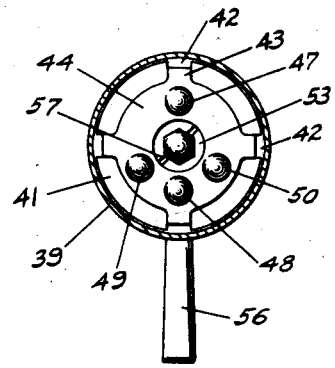
Fig. V
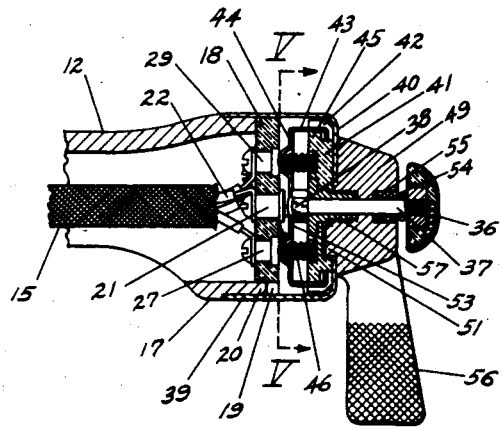
Fig. IV
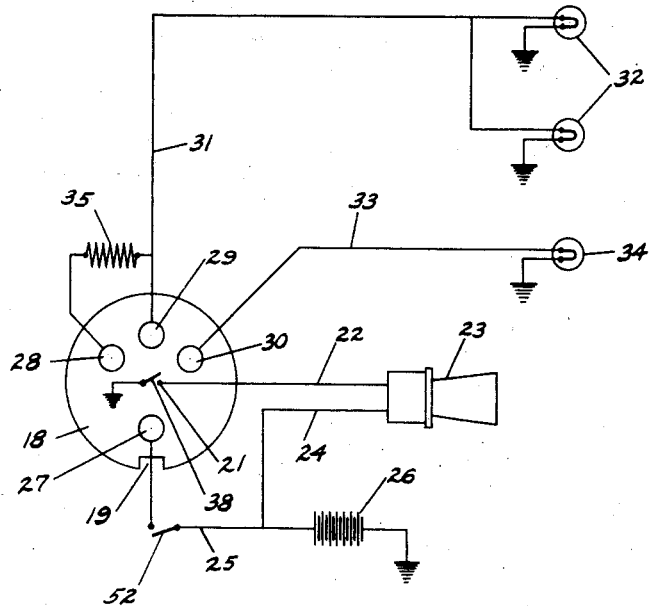
Fig. VI
Inventors.
Arthur J. Baker
Edward E. Huntington Patented June 9, 1931

1,809,100

UNITED STATES PATENT OFFICE

ARTHUR J. BAKER AND EDWARD E. HUNTINGTON, OF TOLEDO, OHIO, ASSIGNORS TO THE WILLYS-OVERLAND COMPANY, OF TOLEDO, OHIO, A CORPORATION OF OHIO

ELECTRIC SWITCH FOR AUTOMOBILES

Application filed March 14, 1924. Serial No. 699,226.

This invention relates to electric switches for automobiles, and has for one object, to provide an improved combination switch beneath the rim of the steering wheel for controlling a plurality of electric circuits, preferably the lighting and horn operating circuits.

Another object of the invention is to provide an improved switch for motor vehicles, embodying two circuit controlling members, so positioned with respect to the steering wheel that both can be readily operated without removing the hand from the wheel or changing its position thereon to any great extent in the control of said members.

Another object of the invention, is to so locate the horn control button that it can be operated by a simple rocking or turning movement of the hand about the rim of the wheel to bring the wrist or fleshy part of the hand into contact with the button, without removing the hand from the wheel.

Another object of the invention is to provide an improved combination switch on an arm projecting from the steering column at one side of the steering wheel, the switch embodying two circuit controlling members, one of which is operable through the other, and both of which are disposed in proximity to the rim of the wheel and in position to be hand operated, without necessitating the removal of the hand from the wheel, the switch controls being so constructed and arranged that there is practically no chance that the operator will manipulate the wrong one, even when he is so occupied with driving as to be unable to glance at the controls.

Another object of the invention, is to provide a combined horn and lighting circuit controlling switch, constructed so that the operating parts of one are carried by the other, in order to reduce the number of parts used and to economize in the cost of manufacture.

Another object of the invention, is to provide a combined horn and light circuit control switch of simple construction, which can be cheaply manufactured and assembled, and which forms a compact and durable construction.

Other objects relating to details of construction and economies of manufacture, will appear from the description to follow, covering that embodiment of the invention, which, for the purpose of the present application, we have illustrated in the accompanying drawings, in which:

Figure I is an elevational view looking forward from the front seat of the vehicle at the steering wheel, beneath which is shown the switch and its supporting arm.

Fig. II is an enlarged detail, elevational view of the steering wheel and a portion of the column, showing the position of the switch and its supporting arm with respect to the wheel.

Fig. III is a detailed section through the arm, taken on line III—III of Fig. II.

Fig. IV is a sectional elevation through the switch, taken longitudinally of the switch arm, on line IV—IV of Fig. III.

Fig. V is a transverse sectional elevation through the switch, taken on line V—V of Fig. IV, and Fig. VI is a diagrammatic view illustrating the horn and lighting circuits controlled by the switch.

In the drawings, we have shown a steering column 10, on which is mounted the usual steering wheel 11. Projecting from the column beneath the wheel, is a switch supporting arm 12 having a split sleeve portion 13 clamped at the desired position upon the column by the screws or bolts 14, as shown in Fig. II. The arm is recessed on its lower side to receive and conceal the cable 15, in which the switch extension wires for the horn and lighting circuits are encased. The cable is carried up along side of the column, as shown in Fig. II, and the arm is provided adjacent the column, with a vertically disposed tubular portion 16 through which the cable extends, and which forms a support for the same at the point where it unites with the arm proper.

The arm is preferably in the form of an inverted channel, as shown in Fig. III, and its outer end terminates in a cylindrical portion 17, with which is suitably connected a vertically positioned insulating plate or disc 18, disposed transversely of the arm, as shown in Fig. IV. The disc, which is secured to the arm by screws, (not shown), is notched at 19 to receive an outwardly projecting lug 20 on the cylindrical portion of the arm, whereby to properly position the disc. At the center of the disc is provided a binding post or contact 21, with which is connected a conductor 22 leading to the horn 23, as shown in Fig. VI. A conductor 24 leads from the horn to a conductor 25, the latter extending from battery 26 to the binding post or contact member 27 on the insulating disc 18. The disc is provided with three other contacts, as indicated at 28, 29 and 30 in Fig. VI. With the contact 29 is connected a conductor 31 extending to the headlights 32, which are connected with the battery through ground, as shown, while a conductor 33 extends from the contact 30 to an auxiliary light 34, which is also connected with battery through ground. A resistance 35 is interposed between the contact 28 and the conductor 31, whereby to effect the dimming of the headlights when desired.

The horn may be sounded by an inward push on the spring pressed button 36 located on the outer end of a stem 37 carrying a head 38 adapted to engage the central contact 21, whereby to ground the horn circuit.

A removable cylindrical cap 39 is secured upon the cylindrical end portion 17 of the arm 12, being held preferably by screws (not shown). The cap forms a housing for the circuit closing portions of the switch, including the contact disc 18.

Rotatably mounted on the inner face of the end wall 40 of the housing, is an insulating plate or disc 41, provided with notches 42 in its peripheral edge, adapted to receive the outwardly extending fingers 43 of a switch plate 44, the fingers being turned inwardly to engage behind the shoulders 45 of said plate, there being sufficient play between the shoulders and the outer wall 40 of the housing, to permit of a slight longitudinal movement of the fingers, and consequently of the switch plate. The switch plate is yieldingly forced inwardly toward the insulating disc 18 by suitable springs 46, as shown in Fig. IV. The switch plate is further provided with a plurality of projecting boss-like portions 47, 48, 49 and 50, arranged equidistant from the center of the plate, as are the contacts 27, 28, 29 and 30 of the insulating disc 18, said contacts having concave centers for receiving the projections on the switch plate, the springs 46 serving to prevent accidental displacement of the switch from either of its operating positions.

The switch may be rotated to "bright" or "dim" position when desired, the dimming being effected by the cutting in of the resistance 35, at which time the auxiliary lamp 34 is lighted.

Rotation of the lighting switch is effected by turning the handle or lever 56. The lever is provided with an annular portion 59, the inner face of which rests on and is rotatable upon the end wall 40 of the cap or housing 39, said annular portion being connected with the insulating disc 41 by means of a screw plug 57 functioning also as a guide for the horn button stem 37, as shown in Fig. IV.

The annular portion 59 of the lever is provided with a projection 51 disposed within a recess formed in the disc 41, which causes the latter to turn upon rotation of the handle. The projection 51 extends through an arcuate slot in the end wall of the housing 39, the length of the slot being such that the lever is necessarily arrested in its two circuit closing positions, or in other words, in the "bright" and "dim" positions.

In the "bright" position, projection 48 of the rotatable switch plate rests upon contact 27 of the disc 18, and projection 47 rests on the contact 29, while in "dim" position, projection 47 rests upon the contact 30, projection 50 upon contact 27, and projection 49 upon contact 28, the lever moving to the left in going from "bright" to "dim" position, as viewed in Fig. VI. By providing only two positions for the lever, and by including means to arrest it in those positions, the operator merely has to throw the lever from one position to another, to accomplish the desired results.

A switch 52 is conveniently located in the lighting circuit for turning off the current when desired. This switch is preferably located on the instrument board, as shown in Fig. I.

The circuit closing member 38 of the horn button switch, operates through an opening 53 in the switch plate 44, as indicated in Figs. IV and V, said member being normally held in open position by a spring 54 seated in a recess 55 formed in the annular portion 49 of the lever, as shown in Fig. IV.

By removing the screws (not shown) which hold the housing 39 in position, the latter, with the parts connected thereto, may be withdrawn, leaving the contact disc 18 and the wires in assembled position upon the arm 12.

The operation of the horn switch through the end of the lighting switch lever, in the manner shown, effects a saving in the number of parts used, while the use of the two relatively thin insulating discs 18 and 41, and the extremely simple design of the contact members between them, together with the operation of the horn circuit closing member through the disc 41 and through the light control lever, affords a very compact and comparatively inexpensive combination switch, which is thoroughly reliable in operation.

An important feature of the invention is, that the horn button and lighting switch lever are so located that either may be easily operated without removing the hand from the steering wheel. This is made possible by extending the horn circuit closing member through the lever so that the former is directly opposite the latter, thus centralizing the two controls and reducing to a minimum, the attention required in locating the switches for operation from time to time.

Another very important feature is, that the horn button can be easily operated by a simple rocking or turning movement of the hand around the rim of the wheel at a point opposite the button, without removing the fingers from the rim. In this case, that portion of the hand adjacent the base of the little finger, can be used to tap the button, while the hand is still held upon the wheel and in full control thereof. This is important, in view of the frequent need for sounding the horn and also in view of the fact that in city driving, it is often necessary to sound the horn just at a time when the hand is most needed for steering the machine, particularly in cases where the left hand is being used for signaling purposes, as when indicating a turning movement.

While we have shown in considerable detail, a specific embodiment of our invention, it is to be understood that this showing and description are illustrative only, and that we do not regard the invention as limited to the details of construction illustrated and described, except insofar as we have included such limitations within the terms of the following claims, in which it is our intention to claim all novelty inherent in the invention broadly, as well as specifically.

We claim as our invention:

1. A switch comprising a base member and a movable member, said base member carrying terminals, one of said terminals being adapted to be connected to a source of electrical energy, and three other of said terminals being adapted to be connected to electrical units, said movable member including a contact plate adapted to co-operate with said terminals, said contact plate being capable of occupying but two operative positions, in one of which it engages said first mentioned terminal and one of said second mentioned terminals, and in the other of which positions it engages said first mentioned terminal and the remaining two of said second mentioned terminals.

2. A switch comprising a base having a plurality of terminals mounted thereon, three of said terminals being connected to electrical units and one of said terminals being connected to a source of electrical energy, a switching member mounted for pivotal movement about said base, said member including a contact plate having contact points disposed in a circular row concentric with the pivotal axis of said member, and means for limiting the pivotal motion of said member, said means and said contact points being so arranged that said member is capable of occupying but two operative positions, in one of which, said contact plate connects but one of said first mentioned terminals with said source of electrical energy, and in the other of which said contact plate connects only the remaining two of said first-mentioned terminals with said source of electrical energy.

3. An automobile switch comprising a metallic support adapted to be secured to an automobile in such a manner as to be in electrical contact with the frame thereof, a metallic switch arm pivoted to an end of the support in contact therewith, an insulating member within the support secured to said switch arm and carrying a metallic contact plate insulated from said support, a nonconducting base member secured within said support and having electrical unit and supply terminals secured thereto and disposed about the circumference of a circle concentric with the pivotal axis of said switch arm and an electrical unit terminal secured at the center of said circle, said contact plate being arranged to selectively connect said circumferentially disposed electrical unit terminals with a supply terminal, and a metallic rod extending through said switch arm and past said contact plate and adapted when depressed to contact said centrally disposed electrical unit terminal to ground the same through said support.

In testimony whereof, we affix our signatures.

ARTHUR J. BAKER.
EDWARD E. HUNTINGTON.